Jan. 25, 1927.  F. BAILEY ET AL  1,615,609
APPARATUS FOR STRAINING FLUIDS
Original Filed July 1. 1925   4 Sheets-Sheet 1

INVENTORS.

Jan. 25, 1927.

F. BAILEY ET AL 1,615,609

APPARATUS FOR STRAINING FLUIDS

Original Filed July 1, 1925   4 Sheets-Sheet 2

INVENTORS.
Frank Bailey
F. H. Jackson
per G. G. M. Wardingham
Attorney

Jan. 25, 1927.                                                   1,615,609
F. BAILEY ET AL
APPARATUS FOR STRAINING FLUIDS
Original Filed July 1, 1925    4 Sheets-Sheet 4
Fig. 7.                         Fig. 8.
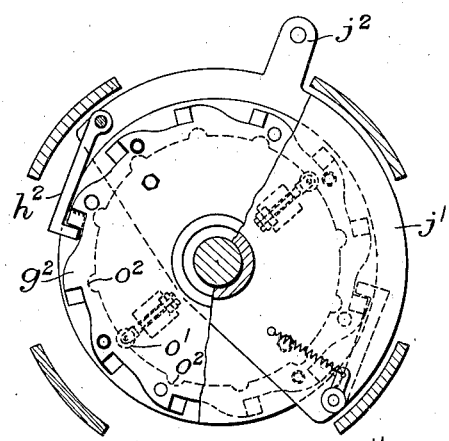
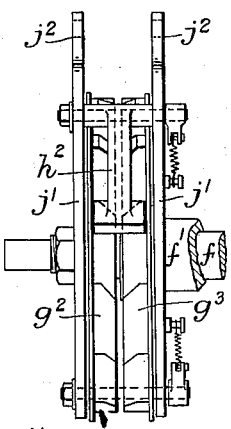
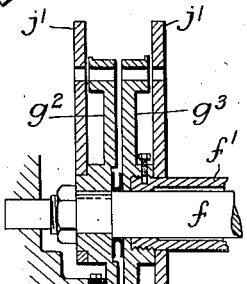
Fig. 9ª                         Fig. 9.
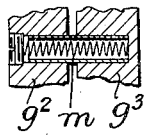
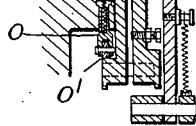
INVENTORS.

Patented Jan. 25, 1927.

1,615,609

UNITED STATES PATENT OFFICE.

FRANK BAILEY AND FREDERICK HENRY JACKSON, OF SOUTHWARK, ENGLAND.

APPARATUS FOR STRAINING FLUIDS.

Original application filed July 1, 1925, Serial No. 40,915, and in Great Britain October 24, 1924. Divided and this application filed January 8, 1926. Serial No. 80,083.

In the specification to the British patent, granted to us and dated 10th February 1903, No. 3,149, is described a self-cleansing strainer comprising a drum-shaped casing, traversed axially by a horizontal shaft, whereon is mounted a wheel, furnished, between its spokes, with grids which serve as straining media; and in the specification to our British patent, dated 12th September 1918, No. 131,755, is described a self-cleansing strainer of a similar character wherein, instead of only half the straining surface being effective for straining purposes, a larger proportion thereof is rendered available for that purpose, whilst the cleansing operation is effected through a comparatively small portion thereof.

Our present invention consists in certain improved methods of construction with the same object, and whereby a still larger proportion of the straining surface is rendered available for straining purposes. Inasmuch, moreover, as the strainer-wheel, instead of rotating, is a fixture, the friction, wear and leakage, which have hitherto occurred between the periphery of the straining wheel and its casing are avoided.

This case is a division of application 40,915, which matured into Patent Number 1,585,817, of May 25, 1926, and in which is described a construction of strainer similar to that herein referred to but designed for use where the apparatus is arranged on the delivery side of a pump and is therefore working under pressure. It is however frequently deemed preferable to place a strainer on the suction side of the pump, and consequently to work under a partial vacuum; the débris being removed from the water prior to its passage through the pump. The method of construction hereinafter described is more particularly intended for working under these latter conditions.

Straining apparatus constructed according to our invention and adapted for working under partial vacuum is illustrated in the accompanying drawings, whereof Fig. 1 is a longitudinal vertical section, Fig. 2 a transverse vertical section and Fig. 3 a transverse horizontal section.

Fig. 7 shows in face view, Fig. 8 in edge view and Fig. 9 in transverse section, ratchet and pawl mechanism adapted for operating a pair of cleanser-boxes when the strainer is worked on the suction system. Fig. 9$^a$ illustrates a detail pertaining to this mechanism.

Assuming the strainer to be arranged on the suction side of a pump and therefore to work under a partial vacuum, the apparatus comprises a cylindrical chamber wherein is fixed a circular straining diaphragm, preferably formed as a disc $a$ with radial spokes $a^1$; the spaces between the spokes constituting sector-shaped chambers the backs of which are formed of grids $a^2$, the fronts of the said chambers being open. On the inlet $b$, or unstrained-water side of the strainer-disc, is mounted a box-like chamber $c^1$ corresponding in form substantially with that of one of the sector-shaped grids; the face of the box presented to the strainer-disc being open. For balancing purposes, we prefer to employ two such box-like chambers—herein referred to as "cleanser-boxes"—and arrange them to extend radially from opposite sides of the centre. A single cleanser-box may however be employed, and a counter-balance weight substituted for the cleanser-box on the radially opposite side. On the opposite side of the grid $a^2$ and opposite the cleanser-box $c^1$ is arranged a similar box $c^2$, hereinafter referred to, for the purpose of distinction, as a "flushing box." This supplementary box is mounted fast on the shaft $f$ which is free to slide longitudinally in its bearings to a limited extent. The cleanser-box $c^1$ is mounted fast upon the hollow shaft or sleeve $f^1$, which latter is also capable of a limited longitudinal movement; the two boxes $c^1$ $c^2$ together constituting a flushing-chamber. Both the shaft $f$ and the sleeve $f^1$ extend through the casing and are suitably packed to prevent the ingress of air. Upon the outer ends of the shaft $f$ and sleeve $f^1$ respectively are fixed discs $g^2$ $g^3$ of the ratchet type for effecting the intermittent rotation of the cleanser- and flushing-boxes $c^1$ $c^2$ by means of a claw-pawl $h^2$ of such form that the oblique pressure exerted in driving tends to draw the discs together, and thereby to relieve the pressure of the boxes $c^1$ $c^2$ upon the faces of the straining disc.

Figure 1:
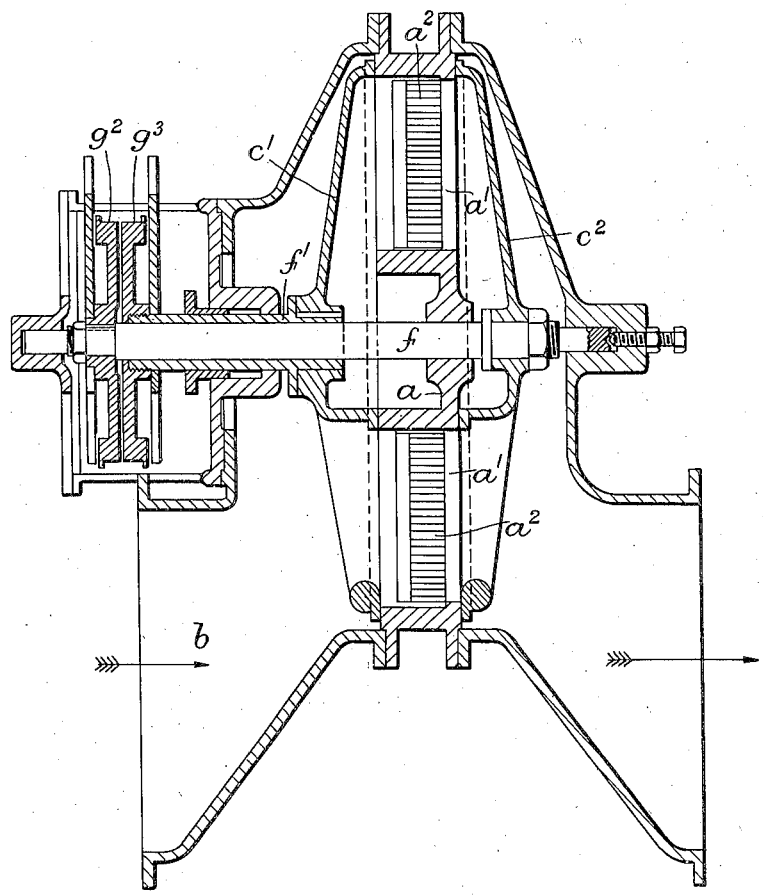
Figure 2:
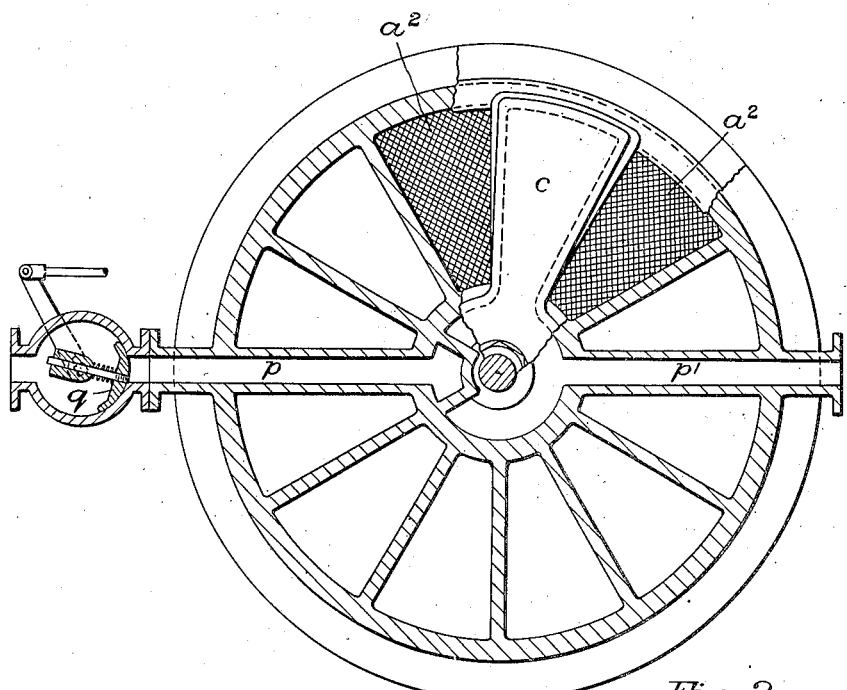
Figure 3:
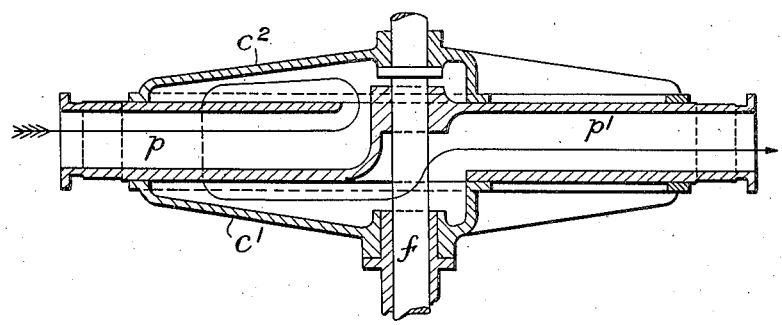

The requisite supply of cleansing water may be taken from that delivered by the pump or from any other convenient source. In Figs. 2 and 3 is shown provision for its introduction by way of a passage $p$ between two of the straining grids, and for its escape, together with the débris, by way of a like passage $p^1$ arranged, in the present instance, on the radially opposite side of the straining disc.

Delivery from the passage $p^1$ is controlled by means of a valve such as described with reference to Figs. 4, 5 and 6; but when working on the suction system, the inlet passage $p$ is also subjected to control by a mechanically operated shutter or valve $q$ (Fig. 2), the action of which is suitably timed to suit the movements of the cleanser and flushing boxes $c^1$, $c^2$.

Figures 4, 5:
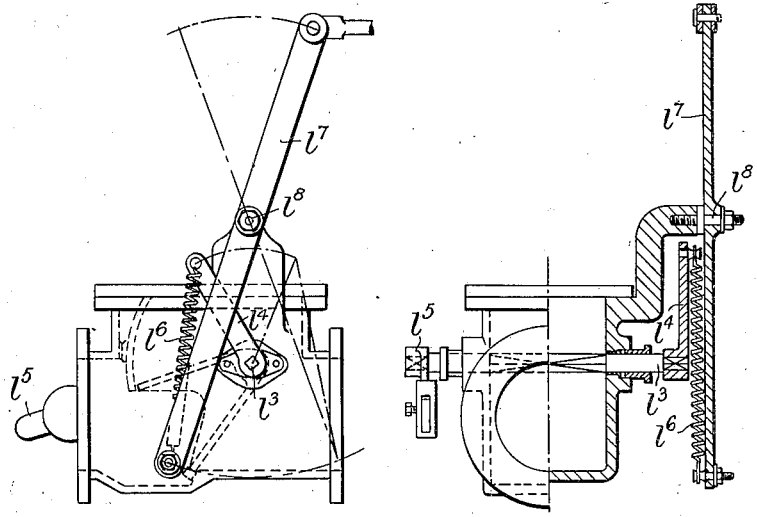
Fig. 4 illustrates in side elevation and Figs. 5 and 6 in vertical section, valve apparatus for controlling the discharge of the flushing water.
Figure 6:
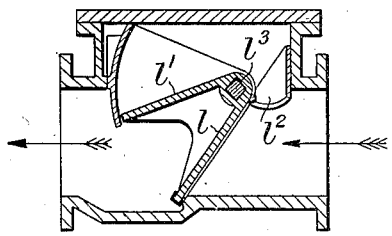

A valve suitable for controlling the discharge from the flushing chamber is illustrated in Figs. 4, 5 and 6. The valve is of V-section, has a shut-off flap $l$ and a pressure balancing flap $l^1$; the pressure-water gaining access to the back of the latter flap by way of the passage $l^2$ with a straining grid. The valve is mounted upon a spindle $l^3$ which passes through glands, arranged in the sides of the valve-casing, and is provided at one end with an arm $l^4$ and at the other end with an arm $l^5$ which latter is furnished with an adjustable weight for balancing purposes. In order to ensure a quick and wide opening for the discharge of débris, and in order to provide against the risk of hard substances lodging under the valve seating and causing damage to the mechanism, this valve is not rigidly connected, but is operated through the agency of a tension-spring $l^6$ which extends from the outer extremity of the arm $l^4$ to the extremity of a lever $l^7$ pivoted at $l^8$. In the position shown in Fig. 4, the tension of the spring tends to hold the flap $l$ of the valve closed upon its seating; but upon the lever $l^7$ being vibrated, the line along which the spring exerts its tensional effort is transferred to the opposite side of the axis of the valve-spindle $l^3$ with the effect that the valve suddenly opens. In like manner, upon the lever $l^7$ being moved in the opposite direction beyond its central position, the valve suddenly closes.

The operation of this valve is timed to open and close whilst the cleanser-box is seated and remains stationary against one of the strainer-chambers, and the valve remains closed during the movement of the cleanser-box to a position opposite the strainer-chamber next in rotation.

The ratchet and pawl mechanism herein before referred to for operating the cleanser- and flushing-boxes, working in pairs is more fully illustrated in Figs. 7, 8 and 9. $g^2$ is the ratchet-wheel fixed on the shaft $f$ whereon the flushing-box $c^2$ is mounted, and $g^3$ the ratchet-wheel fixed on the sleeve $f^1$ which carries the cleanser-box $c^1$. In the construction at present under consideration, the step-by-step rotation of these two boxes is in unison and both ratchet-wheels are operated by the same pawl $h^2$.

This pawl is pivoted between two centrally mounted plates $j^1$ $j^1$ to which a vibratory movement is imparted by means of a reciprocating rod connected between the radial extensions $j^2$ $j^2$. The working faces of the teeth of the ratchet-wheels $g^2$ $g^3$ are inclined in opposite directions, as shown in Figs. 7 and 8; and the working face of the pawl is formed to correspond, the effect of which is to draw the ratchet-wheels towards one another, and thereby to reduce or eliminate the friction between the faces of the boxes $c^1$ $c^2$ and the faces of the disc which carries the straining grids $a^2$, during the rotative movement of the former in relation to the latter; both the shaft $f$ and the sleeve $f^1$ being capable of sliding to a limited extent in their bearings. Upon the pulling effort of the pawl upon the teeth of the ratchet-wheels ceasing, spiral springs which are housed in recesses in the adjacent faces of the ratchet-wheels, as shown on a larger scale in Fig. 9a, come into operation to force the ratchet-wheels apart and to seat the boxes $c^1$ $c^2$ water-tight against the opposite faces of the strainer-disc. In order to provide against the ingress of air between the ratchet-wheels and along the shaft $f$ a U-shaped leather or other suitable packing $n$ is inserted between the wheels $g^2$ $g^3$.

For the purpose of correctly registering the positions of the cleanser and flushing boxes $c^1$ $c^2$ in relation to the respective strainer-grids $a^2$ whilst being flushed, one or more roller-furnished and spring-supported plungers $o$ are mounted in the machine-frame; the rollers $o^1$ engaging in shallow recesses $o^2$ formed in suitable positions in the inner surface of the rim of the ratchet-wheel $g^2$. Such semi-locking devices serve to prevent inconvenient oscillation or motion of the boxes during the débris-flushing periods. The comparatively slight locking effect of the plungers $o$ is readily overcome upon the pawl $h^2$ coming into operation.

For the better seating of the cleanser and flushing-boxes during their cleansing periods, they may be driven slightly beyond their true seating positions, and then returned to their correct positions, either by the locking device or by the return-stroke of the pawl.

Figure 10:
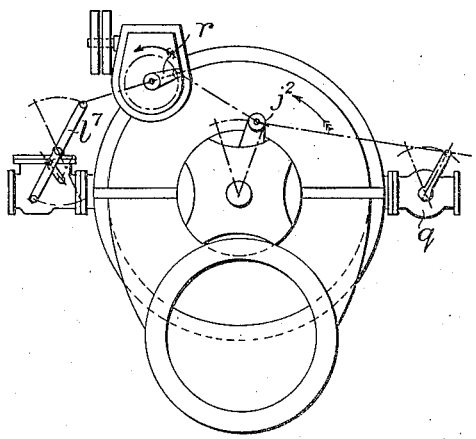
Fig. 10 is a diagrammatic view showing the assemblage of certain parts in their working positions.

In Fig. 10 is illustrated the manner in which certain parts hereinbefore described in detail are or may be assembled. The revolving crank $r$ vibrates two levers $l^1$ and $q$; the former operating a partially balanced valve of the character described with reference to Figs. 4, 5 and 6, whilst the lever $q$ controls the admission of the water used for flushing. The crank $r$ also vibrates the lever $j^2$ which operates the ratchet and pawl mechanism, described with reference to Figs. 7, 8 and 9, for gradually rotating the cleanser-box $c^1$, and the flushing-box $c^2$.

As already stated, the flushing and cleanser boxes rotate in unison; and whilst they are in movement, the inlet valve $q$ and the outlet valve $l$ are closed. Upon the said boxes having arrived opposite one of the grids $a^2$, these valves are opened to admit the flushing water by way of the passage $p$, and to permit of its exit by way of the passage $p^1$; the water traversing in its course the particular grid $a^2$ enclosed between the two boxes. The valves $q$ and $l$ are then closed, and the flushing and cleanser boxes proceed to the next straining grid in succession. Means whereby the relative movements of mechanical appliances, such as the valves referred to, may be suitably timed are well known.

The apparatus herein described and claimed is primarily intended for use in straining water and for the purpose of description, we have confined ourselves thereto; but we would have it understood that the general principle of construction is equally applicable in the removal of solid impurities from other liquids or aeriform fluids.

We claim:—

1. A self-cleansing strainer comprising a chamber, a circular straining medium which is stationary and is divided into numerous sectors fitted with straining grids, a sector-shaped cleanser-box and a like flushing-box arranged on the opposite sides of the said straining medium, and means for gradually rotating them in unison; the said boxes constituting a chamber which encloses the grid-furnished sector whilst undergoing the flushing operation.

2. For use in a self-cleansing strainer of the character defined in claim 1, a partially balanced valve for controlling the discharge of the water employed for flushing the strainer-grids; such valve being formed with a shut-off flap and a pressure-balancing flap, the spindle whereon the said valve is mounted being furnished with an arm the outer extremity of which is connected, by means of a tension spring, with one end of a vibrating lever, the opposite end of which is in connection with a rod whereby the valve is operated; the arrangement of the parts being such that the spring fully opens or fully closes the valve upon the operating lever entering upon the second half of its stroke.

3. For use in operating a pair of cleanser and flushing-boxes such as referred to in claim 1, duplex ratchet and pawl mechanism comprising two ratchet-wheels, respectively in connection with the two boxes, and a claw-pawl in operative relation to both ratchet wheels; the ratchet-teeth of the respective wheels being inclined in such a manner that, when subjected to the pull of the claw-pawl, the two discs are slightly drawn towards one another against the effort of springs acting in the opposite direction, with the effect that the pressure of the cleanser and flushing-boxes upon the opposite faces of the strainer-disc is relieved and the rotation of the boxes facilitated.

4. For use in conjunction with duplex ratchet and pawl mechanism of the character herein described and with a cleanser-box, a semi-locking device consisting of a roller-furnished and spring-supported plunger mounted in the strainer-disc, in conjunction with a ratchet-wheel having, in the inner face of its rim, a recess adapted for the reception of the plunger-carried roller; such device serving to check oscillation of the cleanser-box during the flushing operation.

5. In a self-cleansing strainer of the character defined in claim 1, the combination, with a mechanically operated valve for controlling the escape of the water used in flushing the straining grids, of a mechanically operated valve for controlling the inlet of the flushing water, and means for suitably timing their operations in relation to the movement of the flushing and cleanser boxes.

FRANK BAILEY.
FREDERICK HENRY JACKSON.